(12) United States Patent
Son et al.

(10) Patent No.: US 9,339,870 B2
(45) Date of Patent: May 17, 2016

(54) PHOSPHORUS-DOPED NICKEL NANOPARTICLE AND METHOD OF MANUFACTURING THE SAME

(71) Applicant: HANWHA CHEMICAL CORPORATION, Seoul (KR)

(72) Inventors: Won Il Son, Seoul (KR); You-Jin Sim, Daejeon (KR); Eui-Duk Kim, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 37 days.

(21) Appl. No.: 14/363,011

(22) PCT Filed: Dec. 4, 2012

(86) PCT No.: PCT/KR2012/010429
§ 371 (c)(1),
(2) Date: Jun. 5, 2014

(87) PCT Pub. No.: WO2013/085249
PCT Pub. Date: Jun. 13, 2013

(65) Prior Publication Data
US 2014/0363676 A1     Dec. 11, 2014

(30) Foreign Application Priority Data

Dec. 9, 2011   (KR) .......................... 10-2011-0132201

(51) Int. Cl.
| | | |
|---|---|---|
| *B22F 1/00* | (2006.01) | |
| *B22F 1/02* | (2006.01) | |
| *B22F 9/24* | (2006.01) | |
| *C22C 1/04* | (2006.01) | |
| *C22C 1/10* | (2006.01) | |
| *C22C 19/03* | (2006.01) | |
| *B82Y 30/00* | (2011.01) | |
| *B82Y 40/00* | (2011.01) | |

(52) U.S. Cl.
CPC ............. *B22F 1/0062* (2013.01); *B22F 1/0018* (2013.01); *B22F 1/025* (2013.01); *B22F 9/24* (2013.01); *B82Y 30/00* (2013.01); *C22C 1/0433* (2013.01); *C22C 1/1026* (2013.01); *C22C 19/03* (2013.01); *B22F 2001/0066* (2013.01); *B82Y 40/00* (2013.01); *Y10T 428/2991* (2015.01)

(58) Field of Classification Search
CPC .......... B22F 1/0018; B22F 1/025; B22F 9/24; B22F 1/0062; C22C 1/0433; C22C 1/1026; C22C 19/03; Y10T 428/2991; B22Y 40/00; B22Y 30/00

USPC ........................................... 428/403; 427/216
See application file for complete search history.

(56) References Cited

U.S. PATENT DOCUMENTS

| 2002/0011131 A1* | 1/2002 | Hosokura et al. ............... 75/373 |
| 2003/0164065 A1 | 9/2003 | Hosokura et al. |
| 2005/0227074 A1 | 10/2005 | Oyamada |

FOREIGN PATENT DOCUMENTS

| CN | 101100002 | 1/2008 |
|---|---|---|
| CN | 101352760 | 1/2009 |
| EP | 1985583 | 10/2008 |
| JP | S55-36695 | 9/1980 |
| JP | 2001-279306 | 10/2001 |
| JP | 2001279306 | * 10/2001 |
| JP | 2002-053904 A | 2/2002 |
| JP | 2003-034879 A | 2/2003 |
| JP | 2004-332055 | 11/2004 |
| JP | 2008-024969 | 2/2008 |
| JP | 2011-063828 | 3/2011 |
| KR | 10-2005-0088675 A | 9/2005 |
| KR | 10-2011-0069811 A | 6/2011 |

OTHER PUBLICATIONS

"Surfynol Catalog", Feb. 5, 2006, Nissin Chemical Industry Co., Ltd.
The Office Action, Japan Patent Office, Jun. 8, 2015, Japanese Patent Application No. 2014-545811.
International Search Report prepared by the Korean Intellectual Property Office on Apr. 1, 2013, for International Application No. PCT/KR2012/010429.
Written Opinion prepared by the Korean Intellectual Property Office on Apr. 1, 2013, for International Application No. PCT/KR2012/010429.
The extended European Search Report, European Patent Office, Nov. 26, 2015, Application No. 12855237.9.

* cited by examiner

*Primary Examiner* — Leszek Kiliman
(74) *Attorney, Agent, or Firm* — Lex IP Meister, PLLC

(57) ABSTRACT

The present invention provides a method of manufacturing a phosphorus-doped nickel nanoparticle. The method includes the steps of: mixing a nickel solution including a nickel compound and a solvent, a seed particle, and a phosphorus-containing reductant in an arbitrary order to prepare a mixed solution; and adjusting pH of the mixed solution such that the mixed solution becomes acidic. According to the method, a phosphorus-doped nickel nanoparticle that is suitable to be applied to solar cell electrodes requiring low contact resistance can be manufactured.

18 Claims, 5 Drawing Sheets

PHOSPHORUS-DOPED NICKEL NANOPARTICLE AND METHOD OF MANUFACTURING THE SAME

CROSS REFERENCE TO RELATED APPLICATIONS

This application is a national stage application under 35 U.S.C. 371 of PCT Application No. PCT/KR2012/010429 having an international filing date of 4 Dec. 2012, which designated the United States, which PCT application claimed the benefit of Korean Application No. 10-2011-0132201 filed 9 Dec. 2011, the entire disclosure of each of which is incorporated herein by reference.

TECHNICAL FIELD

The present invention relates to a phosphorus-doped nickel nanoparticle and a method of manufacturing the same. More particularly, the present invention relates to a phosphorus-doped nickel nanoparticle which can provide a high-concentration impurity region and low contact resistance when it is applied to an electrode, and a method of manufacturing the same.

This application claims priority to and the benefit of Korean Patent Application No. 10-2011-0132201 in the Korea Intellectual Property Office filed on Dec. 9, 2011, which is hereby incorporated by reference in its entirety into this application.

BACKGROUND ART

Recently, according to the prediction of existing energy resources such as petroleum, coal and the like being exhausted, alternative energy resources have attracted considerable attention. Among these alternative energy resources, solar cells for directly converting solar energy into electrical energy using a semiconductor device are spotlighted as a next-generation cell. Solar cells are largely classified into silicon solar cells, compound semiconductor solar cells and tandem solar cells. Among such solar cells, silicon solar cells are generally used.

Meanwhile, in order to manufacture a high-efficiency solar cell, various components, such as a shallow emitter, a selective emitter and the like, have been developed. The shallow emitter, which is called an emitter layer having a high surface resistance of 60~120 Ω/sq, is applied to a high-efficiency solar cell because it has a low recombination rate and can use short-wavelength solar light.

The emitter layer of a general solar cell has a thickness of 600 nm or more, whereas the emitter layer of a high-efficiency solar cell has a thickness of 100 to 500 nm, which is an ultra-slim emitter layer. Therefore, the emitter of a high-efficiency solar cell is problematic in that, at the time of forming an electrode, an electrode comes into contact with a base through a thin emitter layer, and thus the electrode easily short-circuits. That is, in order to commercially use a high-efficiency solar cell including a thin emitter layer, a process for easily bringing an electrode into contact with a thin emitter layer and preventing the electrode from coming into contact with a silicon substrate (base) and short-circuiting is required.

As a method of using the advantage of a shallow emitter and solving the disadvantage thereof, Korean Patent Application No. 2010-7022607 discloses a method of forming a nickel (Ni)-silicide layer by heat-treating a nickel (Ni) layer having low contact resistance. Here, the method for forming a nickel (Ni)-silicide layer further includes the steps of selective electroless plating and then annealing a nickel layer to form a nickel-silicide layer, electroplating the nickel-silicide layer to form a plurality of contact sites thereon, and forming a low-resistance contact line for a photovoltaic device. However, this method is problematic in that it is complicated because it needs an electroless plating process and a selective plating process in order to form a nickel layer, and in that costs increase.

Therefore, it is required to develop a simple process for forming a nickel layer having low contact resistance.

DISCLOSURE

Technical Problem

Accordingly, the present invention has been made to solve the above-mentioned problems, and an object of the present invention is to provide a phosphorus-doped nickel nanoparticle which can be suitably applied to an electrode requiring low contact resistance.

Another object of the present invention is to provide a method of manufacturing the phosphorus-doped nickel nanoparticle.

Technical Solution

In order to accomplish the above objects, an aspect of the present invention provides a phosphorus-doped nickel nanoparticle, including: a seed particle; and a nickel layer formed on the seed particle and doped with phosphorus, wherein the phosphorus-doped nickel nanoparticle has a nanosized diameter.

Another aspect of the present invention provides a method of manufacturing a phosphorus-doped nickel nanoparticle, including the steps of: mixing a nickel solution including a nickel compound and a solvent, a seed particle, and a reductant including phosphorus in an arbitrary order to prepare a mixed solution; and adjusting pH of the mixed solution such that the mixed solution becomes acidic.

Still another aspect of the present invention provides a phosphorus-doped nickel nanoparticle manufactured by the method.

Advantageous Effects

According to the present invention, a nickel nanoparticle doped with high-concentration phosphorus can be efficiently manufactured using a simple method.

Further, the phosphorus-doped nickel nanoparticle of the present invention can be used in various electrodes requiring low contact resistance, and, particularly, can be used in an electrode of a solar cell to increase power generation efficiency.

DESCRIPTION OF DRAWINGS

The above and other objects, features and advantages of the present invention will be more clearly understood from the following detailed description taken in conjunction with the accompanying drawings, in which.

Best Mode

Figure 1:
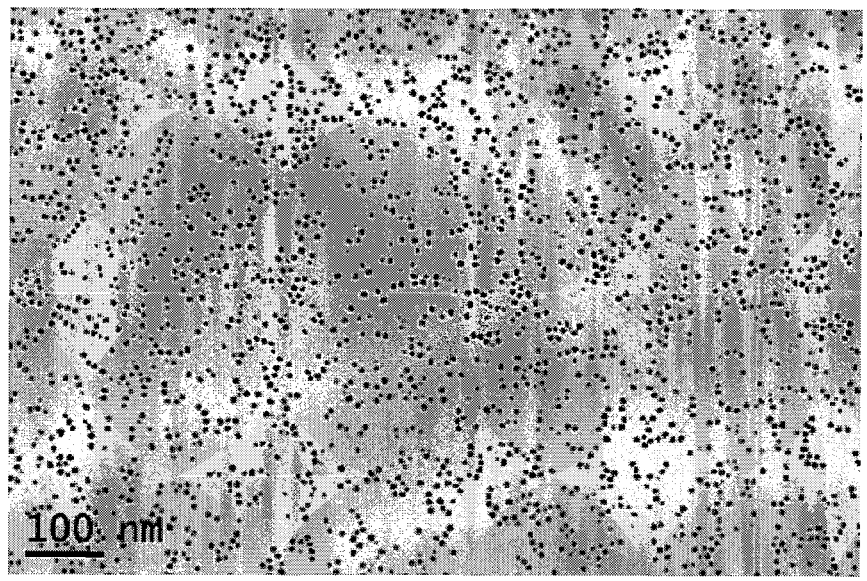
FIG. 1 is a photograph showing seed particles, which were magnified 50,000 times using a transmission electron microscope (TEM)

The phosphorus-doped nickel nanoparticle according to an embodiment of the present invention includes a seed particle, and a nickel layer formed on the seed particle and doped with phosphorus, and has a nanosized diameter.

The method of manufacturing a phosphorus-doped nickel nanoparticle according to an embodiment of the present invention includes the steps of: mixing a nickel solution including a nickel compound and a solvent, a seed particle, and a phosphorus-containing reductant in an arbitrary order to prepare a mixed solution; and adjusting a pH of the mixed solution such that the mixed solution becomes acidic.

Hereinafter, a phosphorus-doped nickel nanoparticle according to the present invention and a method of manufacturing the same will be described in detail.

The phosphorus-doped nickel nanoparticle according to the present invention includes a seed particle, and a nickel layer formed on the seed particle and doped with phosphorus, and has a nanosized diameter. The average particle size of the phosphorus-doped nickel nanoparticle of the present invention may be about 5 to about 200 nm, preferably, about 10 to about 100 nm.

Further, the amount of phosphorous may be about 1 to about 25 wt %, preferably, about 10 to about 20 wt % based on the total amount of the phosphorus-doped nickel nanoparticle.

The phosphorus-doped nickel nanoparticle of the present invention can be used in conductive patterns of various electric/electronic devices, and particularly, can be usefully used to form an electrode of a high-efficiency solar cell.

The method of manufacturing a phosphorus-doped nickel nanoparticle according to the present invention includes the steps of: mixing a nickel solution including a nickel compound and a solvent, a seed particle, and a phosphorus-containing reductant in arbitrary order to prepare a mixed solution; and adjusting a pH of the mixed solution such that the mixed solution becomes acidic.

The seed particle serves as a catalytic nucleus for growing nickel. A transition metal may be used as the seed particle. Examples of the transition metals may include Pd, Cu, Ru, Pt, Ag, Co and the like. They may be used independently or in the form of a mixture or alloy thereof. In this case, the seed particle may have an average particle size of about 2 to about 15 nm.

According to an embodiment of the present invention, palladium (Pd), which is a transition metal, may be used as the seed particle.

The seed particle can be formed by adding a reductant to a transition metal solution including a precursor compound of a transition metal, reducing the precursor compound and then recovering the transition metal from the transition metal solution. The transition metal solution may include ultra-pure water (deionized water) and a high boiling point alcohol of 2 to 10 carbon atoms. More specifically, according to an embodiment of the present invention, a transition metal compound is added to a solvent including ultra-pure water (deionized water) and an alcohol of 2 to 10 carbon atoms having a boiling point of 150° C. or higher to obtain a transition metal compound solution. A reductant solution is slowly dripped into the obtained transition metal compound solution while stirring this transition metal compound solution to cause a reaction, thus forming seed particles. Then, centrifugal separation is carried out to form seed particles for growing nickel.

The concentration of the transition metal compound solution may be about 0.01 to about 100 g/L, preferably about 0.01 to about 50 g/L, and more preferably about 0.1 to about 20 g/L. The concentration of the transition metal compound solution is related to the number of nickel nanoparticles to be formed. When the concentration of the transition metal compound solution is extremely low, the number of nickel nanoparticles to be formed decreases. When the concentration thereof is extremely high, the number of nickel nanoparticles to be formed increases, but it may be not advantageous in terms of cost.

The nickel solution may be prepared by dissolving a nickel compound in a solvent.

The nickel solution may be prepared by dissolving a nickel compound, a precursor of nickel, in a solvent. For example, the nickel compound may be at least one selected from the group consisting of nickel chloride ($NiCl_2$), nickel sulfate ($NiSO_4$), nickel acetate ($Ni(OCOCH_3)_2$), nickel acetylacetonate ($Ni(C_5H_7O_2)_2$), nickel halide ($NiX_2$, where X is F, Br, or I), nickel carbonate ($NiCO_3$), nickel cyclohexanebutyrate ($[C_6H_{11}(CH_2)_3CO_2]2Ni$), nickel nitrate ($Ni(NO_3)_2$), nickel oxalate ($NiC_2O_4$), nickel stearate ($Ni(H_3C(CH_2)_{16}CO_2)_2$), nickel octanoate ($[CH_3(CH_2)_6CO_2]2Ni$), and hydrates thereof. However, examples of the nickel compound are not limited thereto.

According to an embodiment of the present invention, the nickel solution may include ultra-pure water (deionized water) as a solvent, and a high boiling point alcohol of 2 to 10 carbon atoms. The high boiling point alcohol can act as both a solvent and a reductant. The high boiling point alcohol may have a boiling point of 150° C. or higher at normal pressure. Further, the high boiling point alcohol may be included in a concentration of about 5,000 to about 50,000 ppm to ultra-pure water.

Examples of the high-boiling point alcohol used in the method may include, but are not limited to, 1-heptanol, 1-octanol, decanol, ethylene glycol, propylene glycol, triethylene glycol, and diethylene glycol.

The phosphorus-containing reductant acts both as a reductant for the nickel compound and as a doping material. When this phosphorus-containing reductant is added, it acts as a reductant in the early stage, thus synthesizing or forming nickel nanoparticles on the surface of the seed particle by the reduction reaction of the nickel compound.

Examples of the phosphorus-containing reductant may include, but are not limited to, ammonium dihydrogen phosphate ($(NH_4)H_2PO_4$), sodium hypophosphite ($NaH_2PO_2 \cdot H_2O$), sodium hexametaphosphate (($NaPO_3)_6$), and sodium hypophosphate ($NaH_2PO_2$).

The step of mixing the nickel solution, the seed particle and the phosphorus-containing reductant may be performed at a temperature of about 80 to about 150° C., preferably, about 80 to about 130° C. When the reaction temperature is below 80° C., nickel nanoparticles are slowly synthesized, which is not efficient. Further, when the reaction temperature is excessively high, the reaction of the nickel solution is explosively conducted, and water is rapidly volatilized, so it is difficult to maintain the concentration of the components in the nickel solution.

The nickel solution including a nickel compound and a solvent, the seed particle and the phosphorus-containing reductant may be mixed in an arbitrary order.

For example, the seed particle may be first mixed with the nickel solution and then the reductant may be added thereto, or the reductant may be first mixed with the nickel solution and then the seed particle may be added thereto. Further, the seed particle and the reductant may be simultaneously and slowly mixed with the nickel solution regardless of order.

According to an embodiment of the present invention, a surface tension depressing compound may be further mixed with the nickel solution.

The surface tension depressing compound may be mixed by adding it to the nickel solution. Further, according to an embodiment of the present invention, a dispersion solution including the surface tension depressing compound may be additionally provided, and then the dispersion solution may be mixed with the nickel solution. Further, the surface tension depressing compound may be added during, before or after the reaction of the nickel solution and the seed particle.

According to an embodiment of the present invention, the seed particle may be directly mixed with the nickel solution.

According to an embodiment of the present invention, the seed particle may be first dispersed in the above-mentioned dispersion solution, and then the nickel solution and the reductant may be mixed with the dispersion solution provided with the seed particle at the same time or regardless of order.

When the surface tension depressing compound is used, the dispersibility of the seed particles and the nickel particles can be still further improved.

Examples of the surface tension depressing compound may include surfactants and alcohols. The kind of surfactants is not particularly limited, and the surfactant used in the present invention may be suitably selected from anionic surfactants such as alkyl benzene sulfonate, cationic surfactants such as higher amine halides, quaternary ammonium salts and alkylpyridinium salts, and amphoteric surfactants.

According to an embodiment of the present invention, the surface tension depressing compound may be at least one selected from the group consisting of polyethylene glycol having a molecular weight of 200 to 20,000, polyvinyl pyrrolidone having a molecular weight of 500 to 400,000, polyalkylene alkyl ether, and polyalkylenealkylethyl, but is not limited thereto.

Further, the surface tension depressing compound may be added in a concentration of about 0.1 to about 10,000 ppm, preferably, about 1 to about 1,000 ppm to the nickel solution.

Subsequently, the pH of the mixed solution is adjusted to 3 to 7 such that the mixed solution becomes acidic.

More specifically, after the nickel solution, the seed particle and the reductant are mixed, a reaction is conducted for a predetermined amount of time, and then the pH of the mixed solution is adjusted such that the pH of the mixed solution in the early stage of the reaction is lower than that of the mixed solution in the latter stage thereof. For example, the pH of the mixed solution may be adjusted to 3 to 7, preferably, 4 to 6. When the pH of the mixed solution is less than 3, which is extremely low, nickel particles may not be synthesized because the nickel ions in the nickel solution do not react with the seed particle. However, when the pH of the mixed solution is more than 7, which is extremely high, the doping of phosphorus is not conducted.

The pH of the mixed solution may be adjusted using a pH adjuster such as various kinds of organic acids or salts thereof, and the pH adjuster may be added such that the pH of the mixed solution is present in a range of 3 to 7. Examples of the organic acids may include, but are not limited to, citric acid, oxalic acid and acetic acid, and examples of the salts thereof may include, but are not limited to, sodium salts, potassium salts and ammonium chloride.

As described above, in the method according to the present invention, the phosphorus-containing reductant acts as both a reductant and a doping material with respect to the nickel solution. That is, in the early stage, nickel nanoparticles are synthesized on the surface of the seed particle by the reduction reaction of the nickel compound, and in the latter stage in which the nickel nanoparticles were somewhat synthesized, the pH of the mixed solution is adjusted such that the pH thereof in the early stage is lower than that of the mixed solution in the latter stage, so the nickel nanoparticles are synthesized and simultaneously doped with the phosphorus included in the reductant. That is, in the early stage of the reaction, the nickel nanoparticles are synthesized on the surface of the seed particle by the reduction reaction of the nickel compound, and, in the latter stage thereof, the reduction reaction of the nickel compound and the doping reaction of the phosphorus are simultaneously conducted under the acidic condition.

In this way, after the reduction reaction of the nickel compound and the doping reaction of the phosphorus are finished, the nickel nanoparticles are washed and vacuum-dried to obtain the phosphorus-doped nickel nanoparticles of the present invention.

According to the method of the present invention, phosphorus-doped nickel nanoparticles can be simply obtained at a low cost.

The phosphorus-doped nickel nanoparticles obtained by the method may have an average particle size of about 5 to about 200 nm, preferably, about 10 to about 100 nm.

Further, the phosphorous may be included in an amount of about 1 to about 25 wt %, preferably, about 10 to about 20 wt % based on the total amount of the phosphorus-doped nickel nanoparticles.

The phosphorus-doped nickel nanoparticles obtained by the method of the present invention can be used in conductive patterns of various electric/electronic devices, and particularly, can be usefully used to form an electrode of a high-efficiency solar cell.

Mode for Invention

Hereinafter, the present invention will be described in more detail with reference to the following Examples. However, these Examples are set forth to illustrate the present invention, and the scope of the present invention is not limited thereto.

EXAMPLES

Preparation of Phosphorus-Doped Nickel Nanoparticle

Example 1

1-1: Formation of Seed Particle 10 g of $PdCl_2$ as a transition metal precursor compound, 100 g of ultra-pure water and 50 g of ethylene glycol were mixed to obtain a transition metal solution. 20 g of sodium hypophosphite ($NaH_2PO_2.H_2O$) as a reductant was diluted with 100 g of ultra-pure water to obtain a reductant solution. The reductant solution was dripped into the transition metal solution at a flow rate of 10 mL/min while stirring the transition metal solution to react the reductant solution with the transition metal solution, thus forming palladium (Pd) seed particles. The formed palladium (Pd) seed particles were introduced into a mixed solution of 50 g of ultra-pure water and 50 g of ethanol, and were then recovered using a centrifugal separator.

FIG. 1 is a photograph showing the recovered palladium (Pd) seed particles, which were magnified 50,000 times using a transmission electron microscope (TEM). Referring to FIG. 1, it can be ascertained that, as a result of measuring the particle sizes of the recovered palladium (Pd) seed particles, palladium (Pd) seed particles having an average particle size of 5 nm were formed.

1-2: Preparation of Phosphorus-Doped Nickel Nanoparticle

Nickel sulfate ($NiSO_4$) was used as a nickel compound, and sodium hypophosphite ($NaH_2PO_2.H_2O$) was used as a phosphorus-containing reductant.

40 g of nickel sulfate was completely dissolved in 100 g of ultra-pure water to prepare a nickel solution (hereinafter, represented by "solution A"). A 0.5 M aqueous sodium hypophosphite ($NaH_2PO_2.H_2O$) solution (hereinafter, represented by "solution B") was prepared, and was then used as a reductant and a doping solution. 50 g of ethylene glycol, 10 g of polyethylene glycol (molecular weight: 20,000) as a surface tension depressing compound, and 0.1 g of DTAB (dodecyltrimethylammonium bromide) as a cationic surfactant were completely dissolved in 100 g of ultra-pure water to prepare a dispersion solution.

The dispersion solution was heated to 80° C., and was then dispersed with 0.5 g of the Pd seed particles formed in Example 1-1 while stirring the dispersion solution. Then, 100 mL of the solution A and the solution B were added to the dispersion solution at a flow rate of 5 mL/min. When 1 minute passed after the addition of the solution A and the solution B, the Pd seed particle-containing dispersion solution became black. At this time, the stirring speed of the dispersion solution was increased, and simultaneously acetic acid was added to this dispersion solution to maintain the pH of the dispersion solution at 4.0. In this state, the reaction was conducted. The dispersion solution was continuously stirred while maintaining the reaction temperature until the foaming of hydrogen stopped after the introduction of nickel sulfate and a reductant, thus obtaining nickel particles.

The obtained nickel particles were washed with water several times, substituted with alcohol, and then vacuum-dried at 80° C. to prepare nickel nanoparticles.

Example 2

Nickel nanoparticles were prepared in the same manner as in Example 1, except that the pH of the dispersion solution was adjusted to 5.0.

Example 3

Nickel nanoparticles were prepared in the same manner as in Example 1, except that the pH of the dispersion solution was adjusted to 6.0.

Comparative Example 1

Nickel particles were prepared in the same manner as in Example 1, except that the pH of the dispersion solution was adjusted to 10.0.

EXPERIMENTAL EXAMPLES

Analysis of Phosphorus-Doped Nickel Nanoparticles

Experimental Example 1

Figure 2:
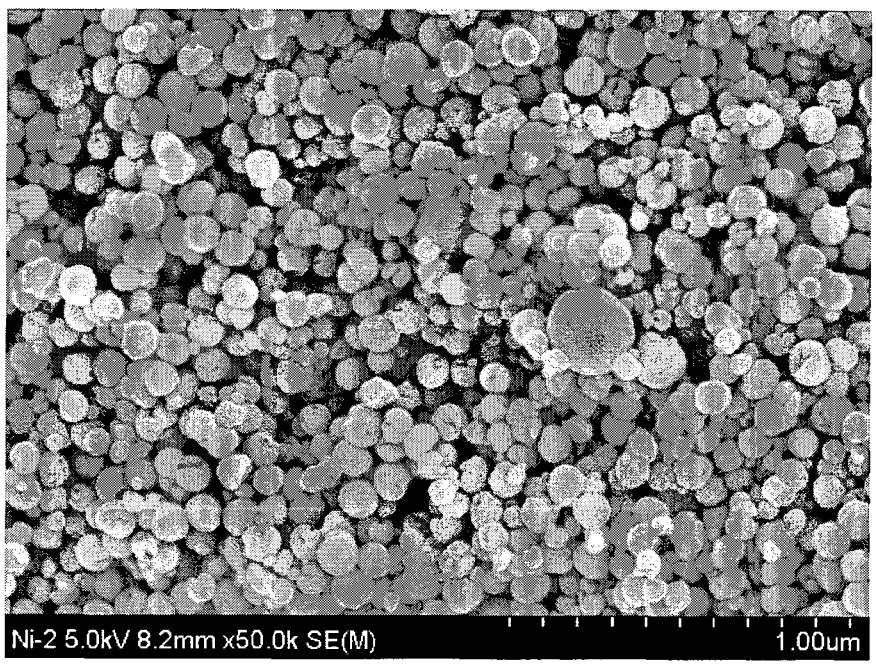
FIG. 2 is a photograph showing nickel nanoparticles manufactured in Example 1, which were magnified 50,000 times using a scanning electron microscope (SEM)

The particle sizes of the nickel nanoparticles obtained in Example 1 were measured by magnifying them 50,000 times using a scanning electron microscope (SEM), and the results thereof are shown in FIG. 2. Referring to FIG. 2, it can be ascertained that nickel nanoparticles having an average particle size of 100 nm were formed.

Figure 3:
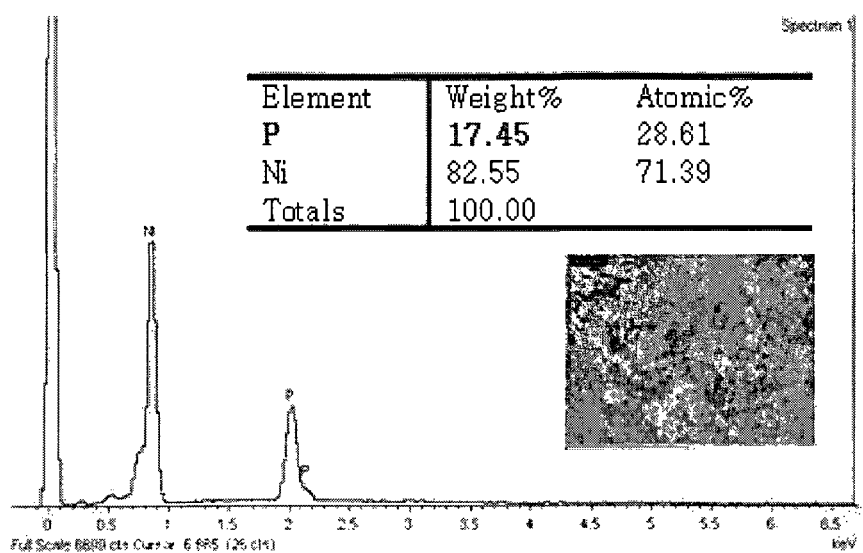
FIG. 3 is a graph showing the results of energy dispersive X-ray (EDX) analysis of the nickel nanoparticles manufactured in Example 1.

Further, the nickel nanoparticles obtained in Example 1 were analyzed using EDX (energy dispersive X-ray microanalysis), and the results thereof are shown in FIG. 3. Referring to FIG. 3, it can be ascertained that phosphorus was included in an amount of 17.45 wt %.

Referring to FIGS. 2 and 3, it can be ascertained that phosphorus-doped nickel nanoparticles were prepared by the method of Example 1.

Experimental Example 2

Figure 4:
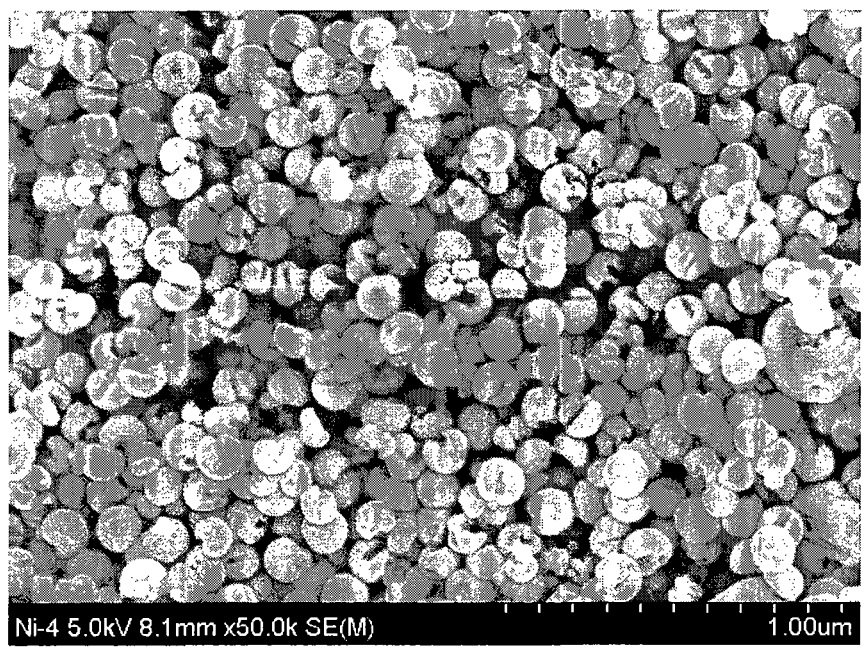
FIG. 4 is a photograph showing nickel nanoparticles manufactured in Example 2, which were magnified 50,000 times using a scanning electron microscope (SEM)

The particle sizes of the nickel nanoparticles obtained in Example 2 were measured by magnifying them 50,000 times using a scanning electron microscope (SEM), and the results thereof are shown in FIG. 4. Referring to FIG. 4, it can be ascertained that nickel nanoparticles having an average particle size of 100 nm were formed.

Figure 5:
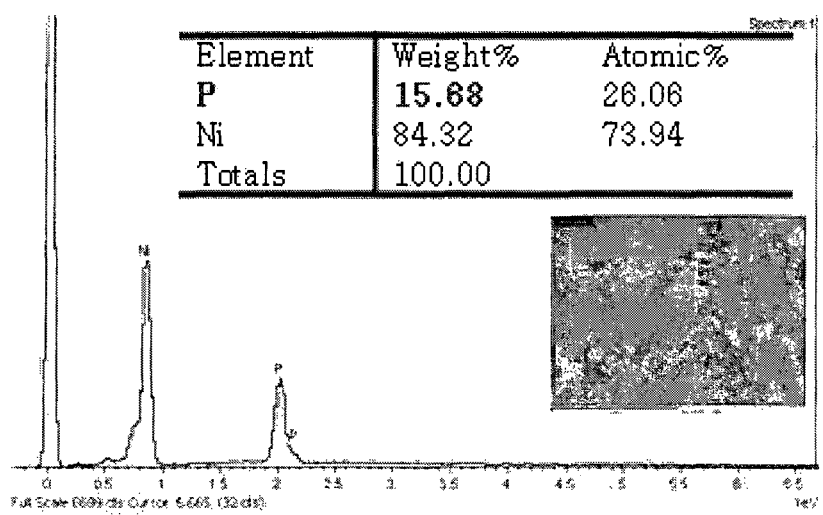
FIG. 5 is a graph showing the results of EDX analysis of the nickel nanoparticles manufactured in Example 2.

Further, the nickel nanoparticles obtained in Example 2 were analyzed using EDX (energy dispersive X-ray microanalysis), and the results thereof are shown in FIG. 5. Referring to FIG. 5, it can be ascertained that phosphorus was included in an amount of 15.68 wt %.

Referring to FIGS. 4 and 5, it can be ascertained that phosphorus-doped nickel nanoparticles were prepared by the method of Example 2.

Experimental Example 3

Figure 6:
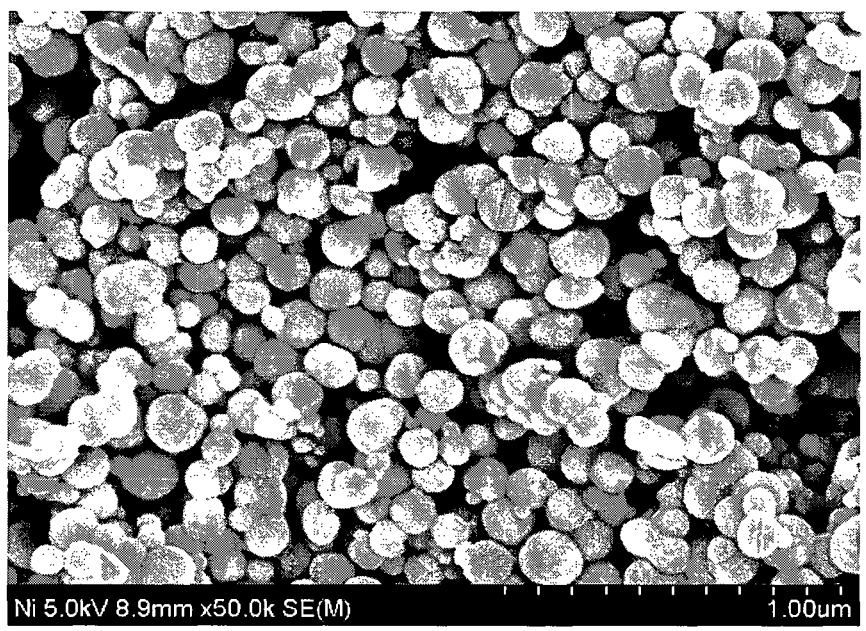
FIG. 6 is a photograph showing nickel nanoparticles manufactured in Example 3, which were magnified 50,000 times using a scanning electron microscope (SEM)

The particle sizes of the nickel nanoparticles obtained in Example 3 were measured by magnifying them 50,000 times using a scanning electron microscope (SEM), and the results thereof are shown in FIG. 6. Referring to FIG. 6, it can be ascertained that nickel nanoparticles having an average particle size of 100 nm were formed.

Figure 7:
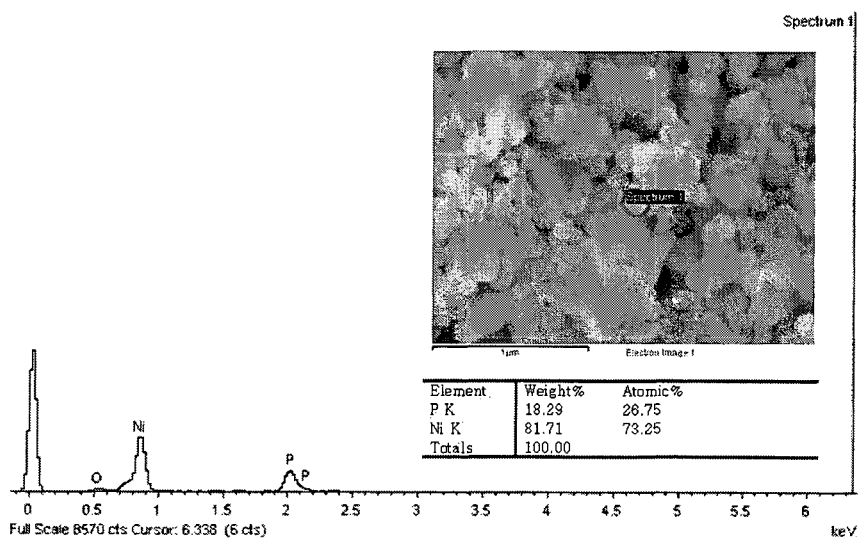
FIG. 7 is a graph showing the results of EDX analysis of the nickel nanoparticles manufactured in Example 3.

Further, the nickel nanoparticles obtained in Example 3 were analyzed using EDX (energy dispersive X-ray microanalysis), and the results thereof are shown in FIG. 7.

Referring to FIG. 7, it can be ascertained that phosphorus was included in an amount of 18.29 wt %.

Referring to FIGS. 6 and 7, it can be ascertained that phosphorus-doped nickel nanoparticles were prepared by the method of Example 3.

Comparative Experimental Example 1

Figure 8:
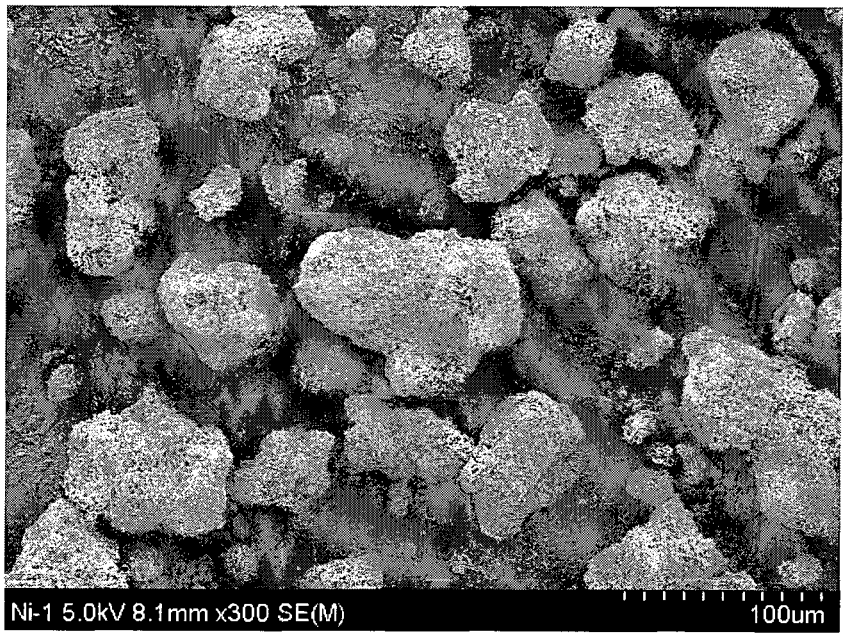
FIG. 8 is a photograph showing nickel nanoparticles manufactured in Comparative Example 1, which were magnified 50,000 times using a scanning electron microscope (SEM)

The particle sizes of the nickel nanoparticles obtained in Comparative Example 1 were measured by magnifying them 50,000 times using a scanning electron microscope (SEM), and the results thereof are shown in FIG. 8. Referring to FIG. 8, it can be ascertained that nickel particles having an average particle size of 1,000,000 nm (100 μm) were formed.

Figure 9:
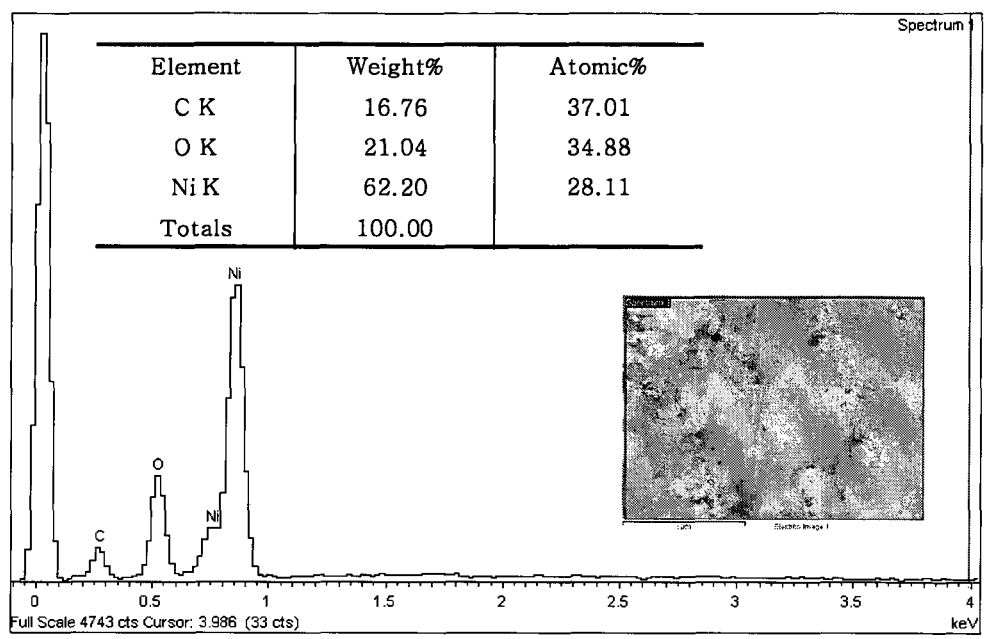
FIG. 9 is a graph showing the results of EDX analysis of the nickel nanoparticles manufactured in Comparative Example 1.

Further, the nickel nanoparticles obtained in Comparative Example 1 were analyzed using EDX (energy dispersive X-ray microanalysis), and the results thereof are shown in FIG. 9. Referring to FIG. 9, it can be ascertained that the peak of phosphorus was not detected.

Referring to Test Examples 1 to 3 and Comparative Test Example 1, it can be ascertained that the nickel nanoparticles prepared by the method of the present invention include phosphorus and have an average particle size of about 100 nm. However, it can be ascertained that the nickel particles prepared in Comparative Example 1 in which the pH of the dispersion solution was adjusted to 10.0 have an average particle size of 100 μm, which deviates from the nanometer scale, and are not doped with phosphorus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a phosphorus-doped nickel nanoparticle, comprising the steps of:
   mixing a nickel solution including a nickel compound and a solvent, a seed particle, and a phosphorus-containing reductant in an arbitrary order to prepare a mixed solution; and
   adjusting pH of the mixed solution to 4 to 6,
   wherein the pH in the early stage of the mixed solution reaction is lower than in the latter stage.

2. The method of claim 1, wherein the seed particle is a transition metal including one or more selected from the group consisting of Pd, Cu, Ru, Pt, Ag and Co.

3. The method of claim 1, wherein the seed particle is prepared by adding a reductant to a transition metal solution including a transition metal compound, ultra-pure water and a high boiling point alcohol of 2 to 10 carbon atoms and then recovering a transition metal from the transition metal solution.

4. The method of claim 3, wherein the transition metal solution has a concentration of 0.01 to 100 g/L.

5. The method of claim 1, wherein the nickel solution includes a nickel compound, ultra-pure water, and a high boiling point alcohol of 2 to 10 carbon atoms.

6. The method of claim 5, wherein the nickel compound is at least one selected from the group consisting of nickel chloride ($NiCl_2$), nickel sulfate ($NiSO_4$), nickel acetate (Ni($OCOCH_3$)$_2$), nickel acetylacetonate (Ni($C_5H_7O_2$)$_2$), nickel halide ($NiX_2$, where X is F, Br, or I), nickel carbonate ($NiCO_3$), nickel cyclohexanebutyrate ([$C_6H_{11}(CH_2)_3CO_2$]$_2$Ni), nickel nitrate (Ni($NO_3$)$_2$), nickel oxalate ($NiC_2O_4$), nickel stearate (Ni($H_3C(CH_2)_{16}CO_2$)$_2$), nickel octanoate ([$CH_3(CH_2)_6CO_2$]$_2$Ni), and hydrates thereof.

7. The method of claim 5, wherein the high boiling point alcohol is at least one selected from the group consisting of 1-heptanol, 1-octanol, decanol, ethylene glycol, propylene glycol, triethylene glycol, and diethylene glycol.

8. The method of claim 1, wherein, in the step of mixing the nickel solution including a nickel compound and a solvent, the seed particle and the phosphorus-containing reductant in an arbitrary order, a surface tension depressing compound is further mixed.

9. The method of claim 8, wherein the surface tension depressing compound is at least one selected from the group consisting of polyethylene glycol having a molecular weight of 200 to 20,000, polyvinyl pyrrolidone having a molecular weight of 500 to 400,000, polyalkylene alkyl ether, and polyalkylene alkylethyl.

10. The method of claim 1, wherein the phosphorus-containing reductant is at least one selected from the group consisting of ammonium dihydrogen phosphate, sodium hypophosphite, sodium hypophosphate, and sodium hexametaphosphate.

11. The method of claim 1, wherein the step of mixing the nickel solution including a nickel compound and a solvent, the seed particle and the phosphorus-containing reductant in an arbitrary order is performed at a temperature of 80 to 150° C.

12. The method of claim 1, wherein the step of adjusting the pH of the mixed solution is performed by adding at least one pH adjuster selected from the group consisting of citric acid, oxalic acid, acetic acid, and sodium or potassium salts thereof.

13. A phosphorus-doped nickel nanoparticle, manufactured by the method of claim 1.

14. The phosphorus-doped nickel nanoparticle of claim 13, wherein the phosphorus-doped nickel nanoparticle has an average particle size of 5 to 200 nm.

15. The phosphorus-doped nickel nanoparticle of claim 13, wherein the phosphorous is included in an amount of 1 to 25 wt % based on a total amount of the phosphorus-doped nickel nanoparticle.

16. A phosphorus-doped nickel nanoparticle, comprising:
   a seed particle; and
   a nickel layer formed on the seed particle and doped with phosphorus,
   wherein the phosphorus-doped nickel nanoparticle has a nanosized diameter,
   wherein the phosphorus-doped nickel nanoparticle has an average particle size of 5 to 200 nm.

17. The phosphorus-doped nickel nanoparticle of claim 16, wherein the seed particle includes one or more selected from the group consisting of Pd, Cu, Ru, Pt, Ag and Co.

18. The phosphorus-doped nickel nanoparticle of claim 16, wherein the phosphorous is included in an amount of 1 to 25 wt % based on a total amount of the phosphorus-doped nickel nanoparticle.

* * * * *